Jan. 17, 1967 T. J. SCHINNER 3,299,298
EMBOSSED CARD READING DEVICE
Filed Nov. 29, 1963 7 Sheets-Sheet 7
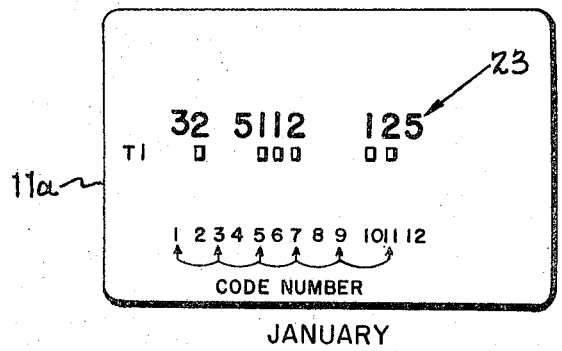
JANUARY
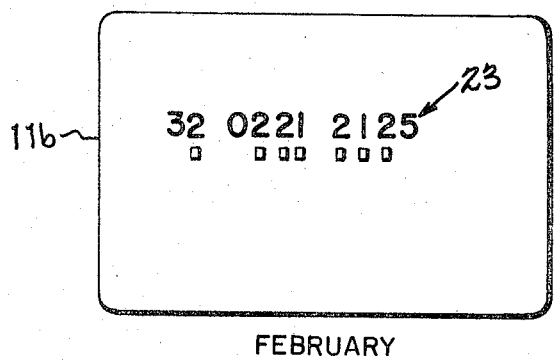
FEBRUARY
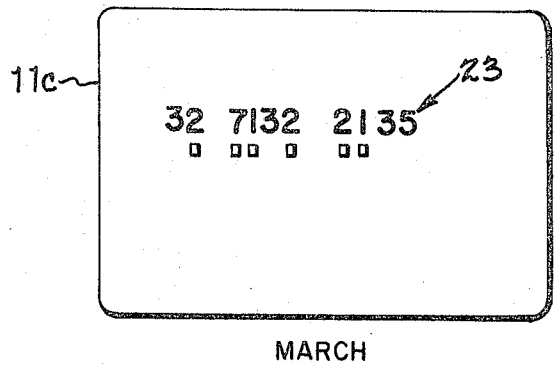
MARCH
SELECTOR SWITCH
SETTINGS
1 2 3 4 5 6
BBAABA
↓
C
↓
BBAAAA
↓
C
↓
BBAAAB
FIG. 12
INVENTOR.
Thomas J. Schinner
BY
Wood, Herron & Evans.
ATTORNEYS.

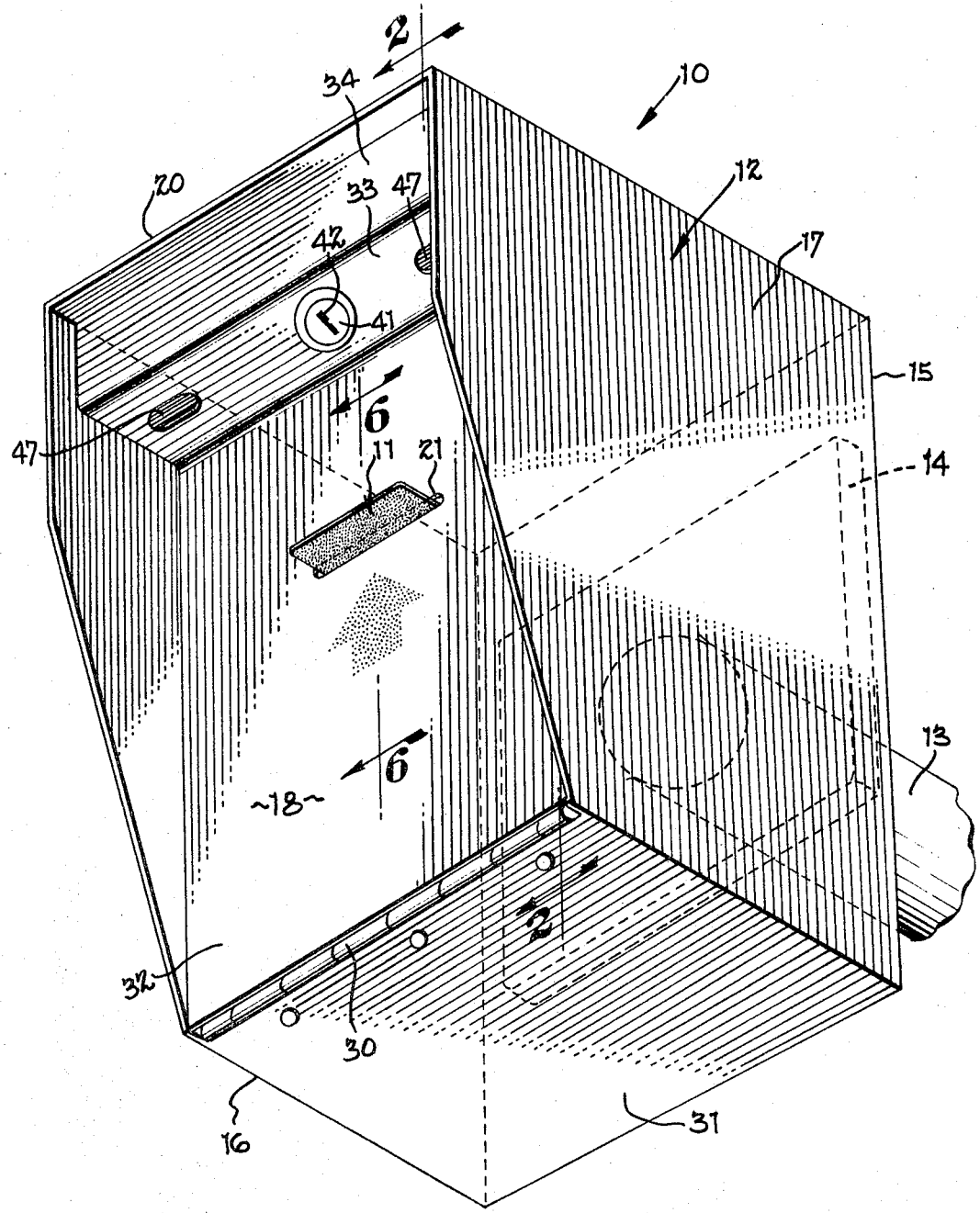

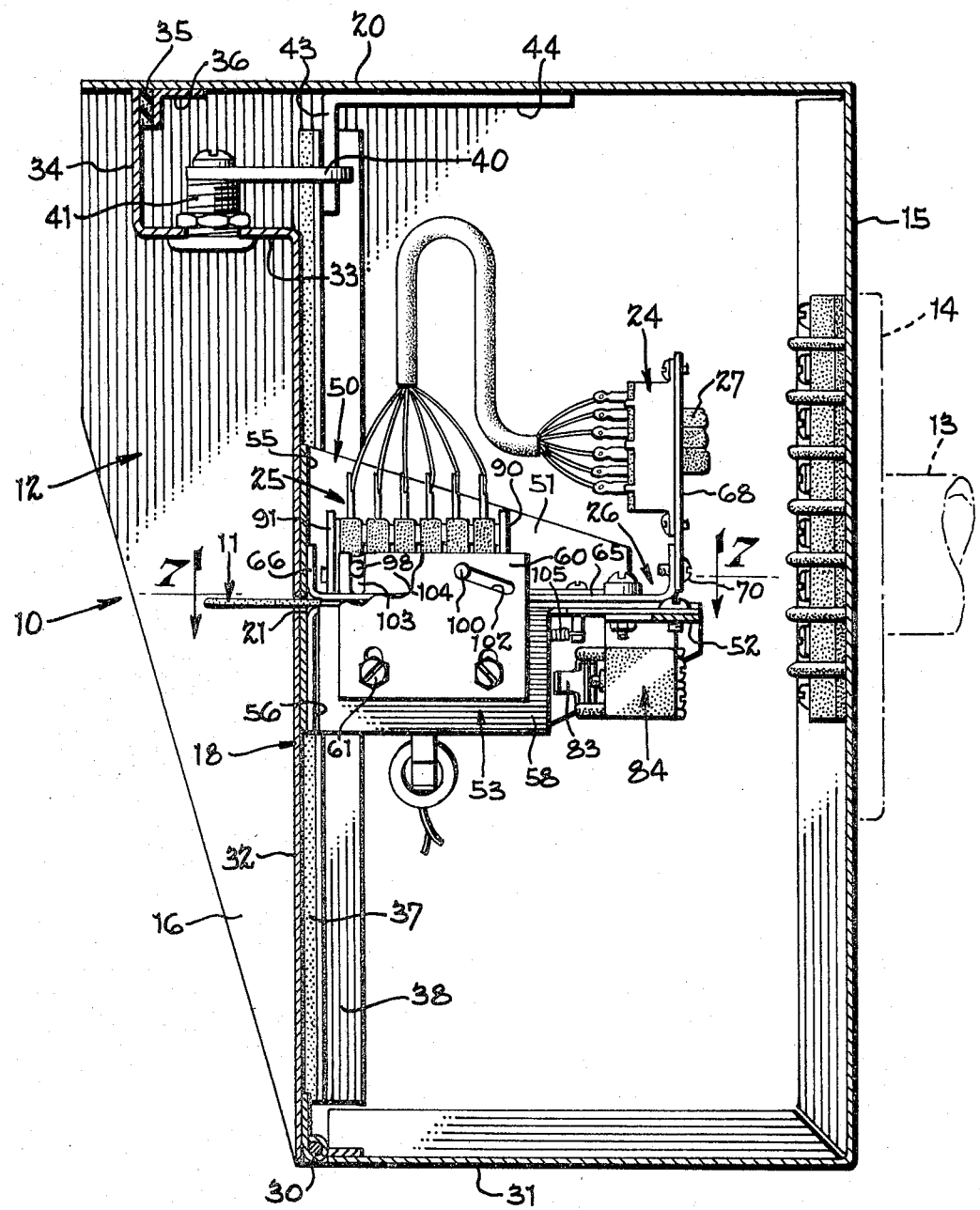

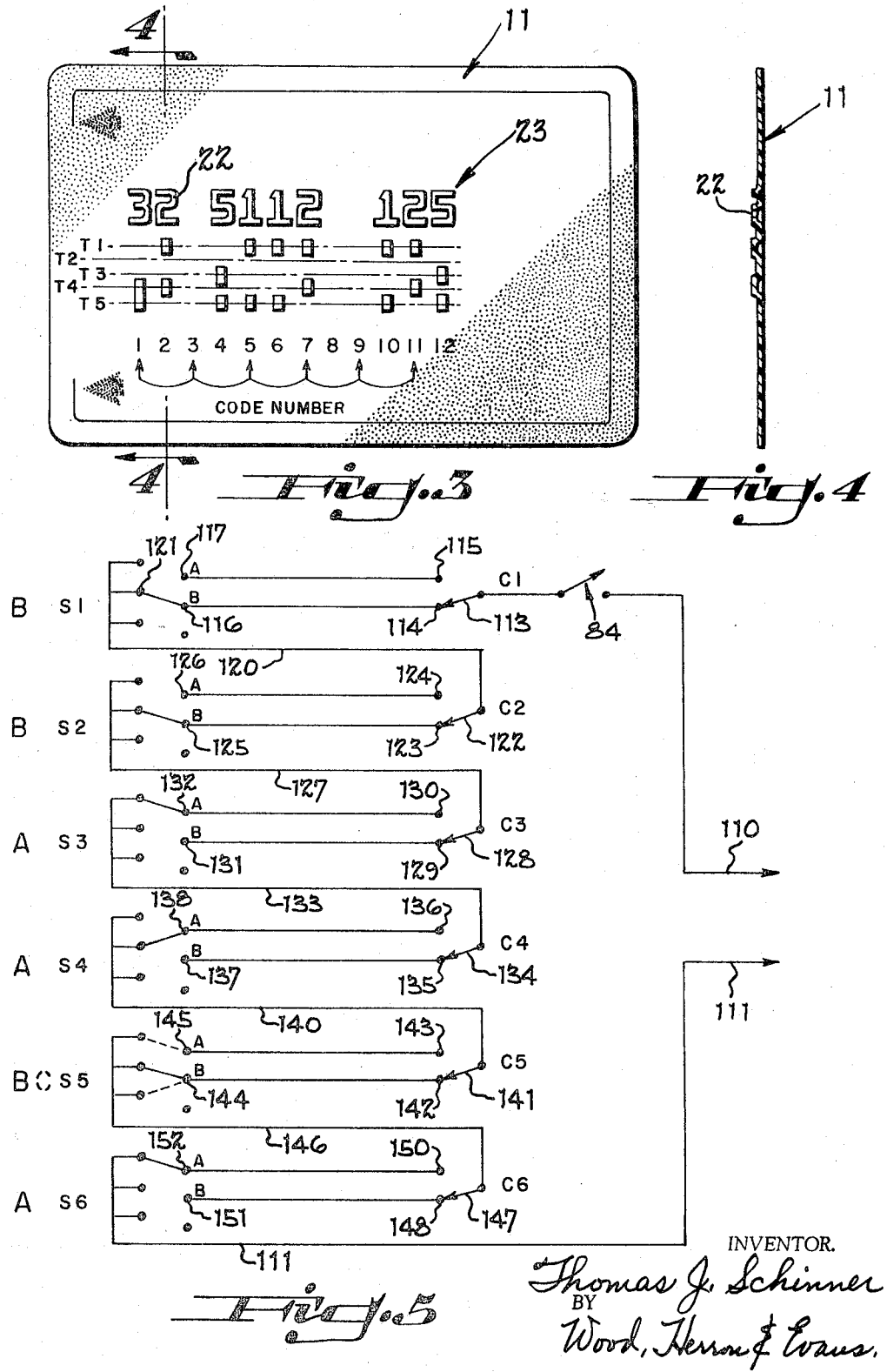

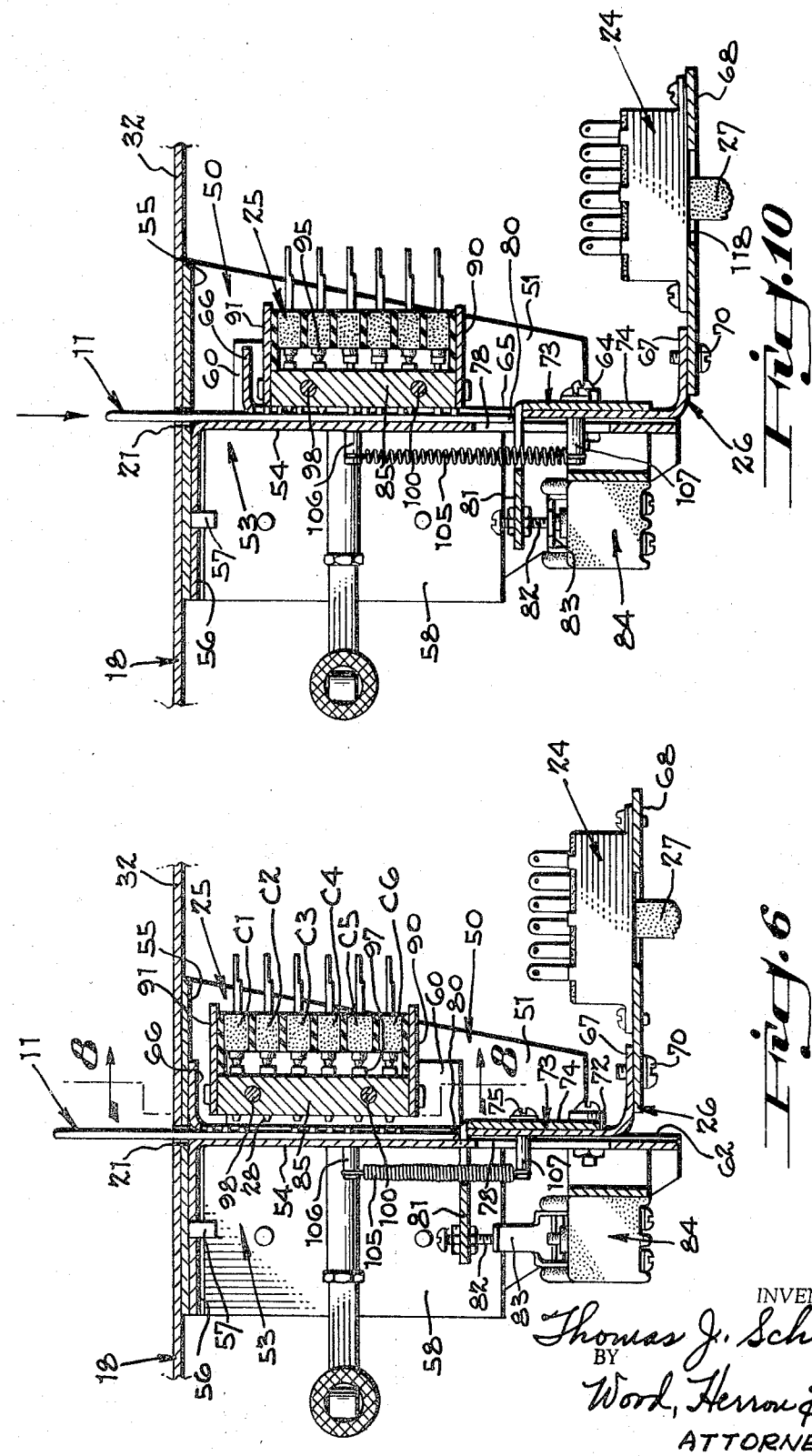

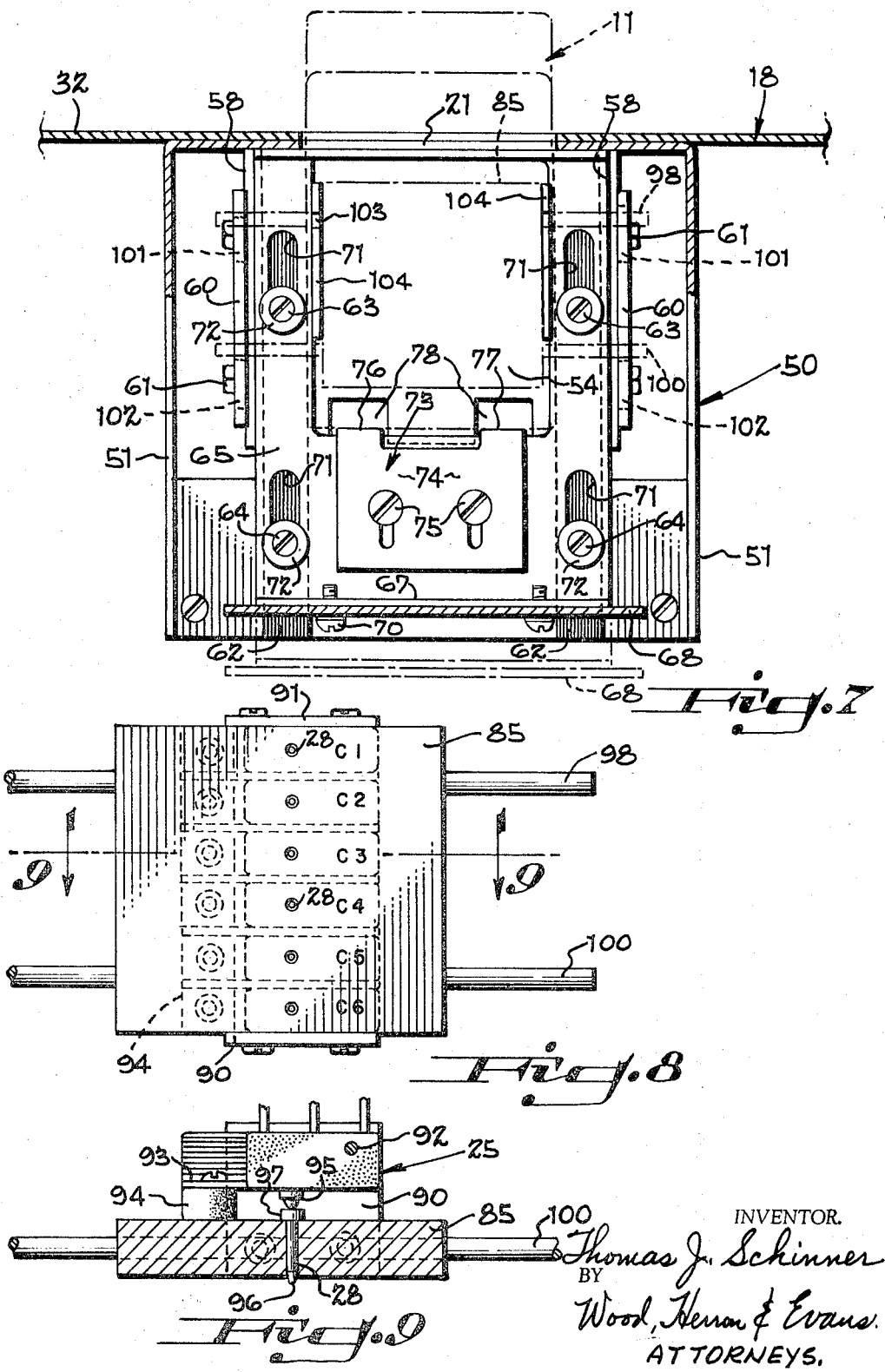

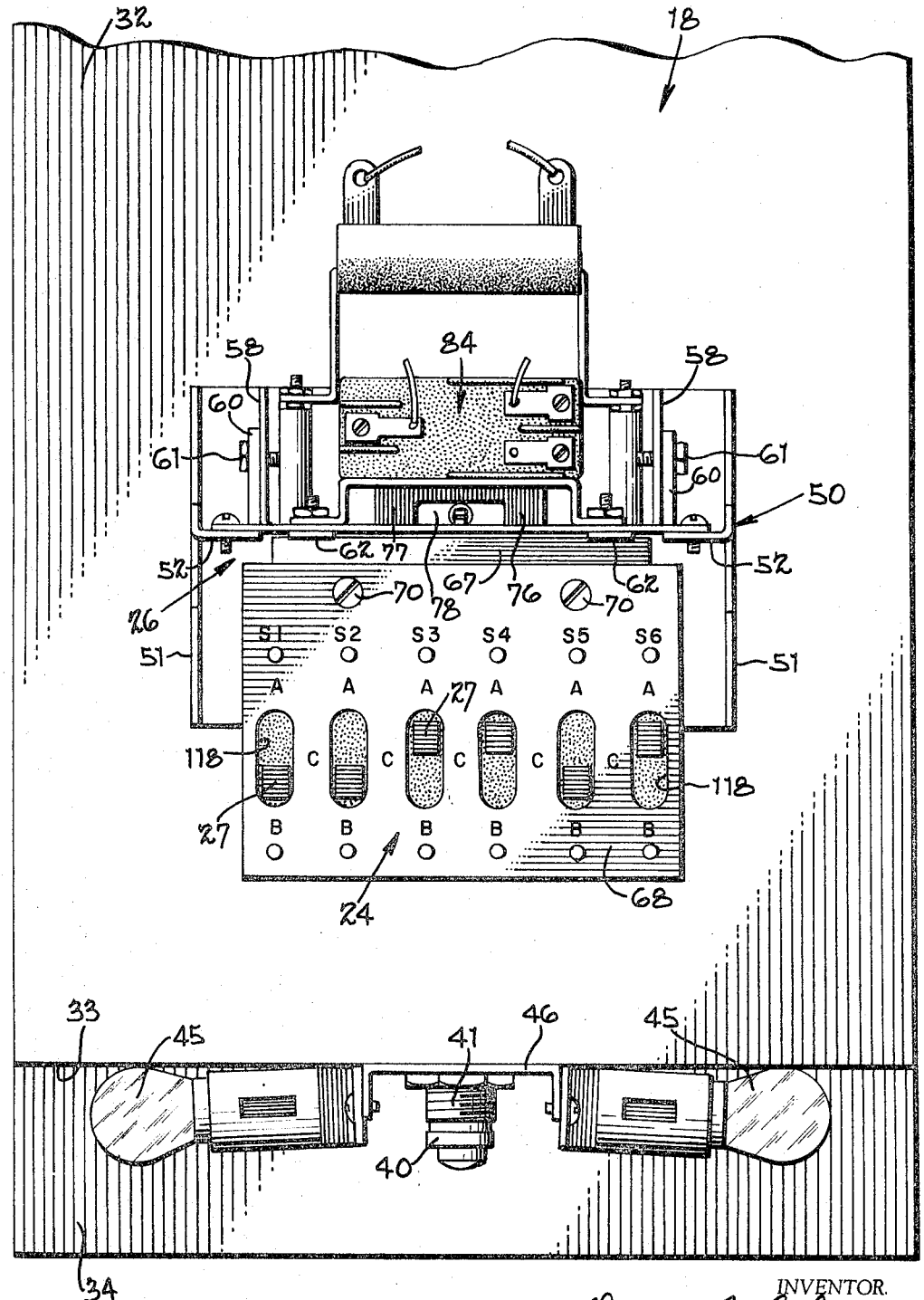

United States Patent Office 3,299,298
Patented Jan. 17, 1967

3,299,298
EMBOSSED CARD READING DEVICE
Thomas J. Schinner, Cincinnati, Ohio, assignor to The Cincinnati Time Recorder Company, Cincinnati, Ohio, a corporation of Ohio
Filed Nov. 29, 1963, Ser. No. 326,661
15 Claims. (Cl. 307—113)

This invention relates to card readers of the type adapted to sense a coded pattern of projections on a semi-rigid card and to complete an electrical circuit whenever a card having a preselected projection pattern is inserted in the reader.

While the present reader can be used in many different types of installations, its use in conjunction with an automatic parking lot is typical. It is felt that the advantages of the present invention can better be understood from a brief description of the manner of operation of a parking lot of this kind. Specifically, a typical automatic parking lot installation of the type with which the present reader can be employed advantageously includes an electrically operated gate. This gate normally closes the entrance to the lot. The lot patrons rent parking spaces for a preselected period, for example a month. During this rental period each patron is given a coded embossed card. When the patron drives up to the lot, he inserts the card in a reader. If the projections on the card presented are arranged in the preselected pattern corresponding to the present month, the card actuates switches in the reader to complete an electrical circuit causing the gate to open allowing the patron to enter the lot. Only cards having the proper preselected projection pattern close a circuit through the reader. Any other card is ineffective to open the gate.

In the past, considerable difficulty has been encountered with installations of this general type due to the tendency of the plastic cards to bend or warp after periods of use. Often, a card is bent to such an extent that it will not operate the reader and hence will not open the gate. If the parking facility is completely unattended, this causes great annoyance and inconvenience to the patron involved.

One of the principal objects of the present invention is to provide a reader which is effective to accurately sense the projections on a card even if the card is in a warped or bent condition. Specifically, the present invention is predicated in part upon the concept of providing a reading unit which is customer-energized. Thus, the present reader includes a series of switches which are initially spaced from engagement with a card as it initially enters the reader. However, when the user forces the card into the machine, he also causes the switches to be mechanically cammed into a card engaging or "sensing" position. In this position the card is flattened and the presence or absence of projections on various points of the card is accurately sensed by the switches.

A second, equally important object of the present invention is to provide a reader which can readily be programmed to complete a circuit for one of a large number of different combinations of projections. More particularly, the present reader comprises two sets of switches, a set of code switches, each code switch being disposed to sense the presence or absence of a projection in a predetermined area of the card, and a set of selector switches which are used to program the reader or "select" the exact projection pattern which will operate the gate or the like. These selector switches are equal in number to the code switches and are connected to the code switches in a gating circuit.

In accordance with the present invention, each of the code switches is a two-position switch. The code switch is connected so that it is effective to complete a circuit to one contact when it senses a projection and to a second contact when it senses no projection. At least some, and preferably all, of the selector switches are three-position switches. The position of the selector switches is changed by setting a conventional switch handle associated with the selector switch.

In essence, the setting of each selector switch determines which of the two contacts of the corresponding code switch is effective to complete a circuit. In other words, the setting of each selector switch determines whether the corresponding code switch is responsive to a projection or a lack of projections. In order to program the reader so that only a preselected projection pattern will complete a circuit, it is only necessary for the operator to set the selector switches in a predetermined fashion in accordance with instructions provided.

One important advantage of the present reader circuit is that it provides a maximum number of code possibilities with a minimum amount of electrical circuitry.

Another extremely important advantage of the present reader is that it provides means whereby the reader can be set up so either of two different projection codes, or patterns, will complete a circuit through the reader. This is highly desirable for installations, such as parking lots, where new cards are issued periodically. In a typical parking lot installation, new cards may be issued on the first day of every month. However, some people may not receive their cards for several days. Thus, by way of example, on the first day of July new cards are issued to patrons of a parking lot replacing June cards. Several regular patrons who had June cards and plan on purchasing July cards may not, for various reasons, be able to do so for several days. In order that these patrons can have continuous use of the lot, it is desirable for the first few days in July to have the reader actuated by both June cards and July cards.

In accordance with the present invention, this is readily accomplished by coding cards intended for sequential use, i.e. the June and July cards in the example given, so that the cards differ from one another only in the presence or absence of one projection. Assume, by way of example, that this change involves adding a projection in the site sensed by the third code switch. For June, the selector switch associated with the third code switch is placed in a first condition so that the third code switch completes a circuit only when no projection is sensed. In accordance with the present invention, on July 1 this selector switch is shifted to a second, or intermediate, position which is effective to cause a circuit to be completed for either position of the third code switch, i.e. whether a projection or the absence of a projection is sensed by that code switch. In other words, so long as the other code switches are properly actuated by the presence or absence of projections in accordance with the predetermined June pattern, a circuit will be completed whether a projection is present or absent in the site sensed by the third switch. Thus, either a June card or a July card, when inserted in the reader, will actuate the gate. After an appropriate grace period, for example several days, the reader is made responsive only to July cards by shifting the selector switch associated with the third code switch to a third position so that a circuit is completed only when the third code switch senses a projection in accordance with the July coding.

One important advantage of the present reader is that changes in the reader program can be made quickly by even unskilled personnel.

These and other objects and advantages of the present invention will be more readily apparent from the following detailed description of the drawings illustrating a preferred embodiment of the invention.

In the drawings:

FIGURE 1 is a perspective view of a card reader embodying the present invention.

FIGURE 2 is a cross sectional view taken along line 2—2 of FIGURE 1, with the support bracket partially broken away to show details of construction.

FIGURE 3 is a top plan view of an embossed card adapted for use in conjunction with the present reader.

FIGURE 4 is a cross sectional view taken along line 4—4 of FIGURE 3.

FIGURE 5 is a schematic circuit diagram of the electrical circuit employed in the reader.

FIGURE 6 is a cross sectional view taken along line 6—6 of FIGURE 1.

FIGURE 7 is a cross sectional view taken along line 7—7 of FIGURE 2.

FIGURE 8 is a cross sectional view taken along line 8—8 of FIGURE 6.

FIGURE 9 is a cross sectional view taken along line 9—9 of FIGURE 8.

FIGURE 10 is a cross sectional view similar to FIGURE 6 showing the position of the switches when a card has been fully inserted in the machine.

FIGURE 11 is a top plan view of the front panel cover pivoted downwardly showing details of the switches.

FIGURE 12 is a diagrammatic view showing three cards adapted for sequential use and showing the corresponding selector switch set up.

The general construction of a reader 10 constructed in accordance with the principles of the present invention is shown in FIGURES 1 and 2, while a typical card 11 adapted for use in conjunction with the reader is shown in FIGURES 3 and 4. More particularly, as is shown in FIGURE 1, the reader 10 comprises a metal housing 12 which is supported at a suitable height from a horizontal arm 13. Arm 13 carries a mounting plate 14 which is in turn bolted or otherwise joined to the rear wall 15 of the housing. This housing includes side walls 16 and 17 which extend forwardly beyond a hinged front panel 18. The top wall 20 of the housing also extends forwardly beyond the front panel to provide a partial shield surrounding a card receiving slot 21 formed in the front wall.

The card receiving slot is dimensioned to receive cards 11. These cards are preferably formed of a suitable tough, semi-rigid plastic, such as polyvinyl chloride or other polymer. The card is preferably embossed to form a plurality of projections 22 extending upwardly from one face thereof. As is described in detail below, these embossed projections are disposed along a plurality of straight line, or tracks, parallel to the longitudinal edge of the card. These cards may also be embossed with a series of code numbers, such as the set of numbers indicated at 23 in FIGURE 3. It is to be understood that in accordance with the present invention, the code numbers are not sensed by the reader, which is responsive only to the prejections formed along one of the tracks.

In a typical use of the present reader, the reader is positioned adjacent to the entrance of a parking lot. This driveway is normally blocked by an electrically operated gate of the type well known in the art. The patrons of the lot rent their parking space on a monthly basis. Each patron is given a monthly card, such as card 11, having a preselected embossed pattern formed thereon. The patron inserts this card into the reader 10. The reader senses the projections on the card, and assuming that they correspond precisely to the pattern set up on the reader, the reader completes an electric circuit to open the gate, permitting the automobile to enter. After the gate is open, the user withdraws his card from slot 21 and retains the card for further use during the month. The present reader is constructed so that it will complete a circuit only when an embossed card having the correct projection pattern is inserted in slot 21. If the card inserted in the slot varies from the selected pattern in any respect, the reader will not complete the circuit so that the entrance remains blocked.

It is to be expressly understood that while the present reader is particularly well suited for use in connection with parking lots having electrically operated gates, the reader can also be advantageously used in any other installations in which it is desirable to permit access to a given area only to authorized personnel. Thus, the present reader may be use to control an electrically actuated gate, door, elevator or any other electrically actuated member in response to the insertion of an embossed card. In such an installation, all personnel with authorization to use the facility in question are provided with embossed cards which they insert in slot 21 of the reader. So long as the card presented has projections of the proper configuration, the reader closes a circuit to actuate the electrically controlled apparatus.

It is further contemplated that the present card reader can be utilized to complete an electrical circuit to other types of electrical apparatus, such as time recorders and the like, whenever a proper card is inserted in the reader.

More particularly, as is best shown in FIGURE 2, the present reader comprises two sets of switches, i.e. a set 24 of selector switches and a set 25 of code switches. Both of these sets of switches are mounted upon a slidable frame assembly 26. Each of the selector switches, S1, S2, S3, S4, S5 and S6 of set 24, is a three-position switch. These switches are programmed periodically by shifting switch handles 27. The code switches, C1, C2, C3, C4, C5 and C6 of set 25, are actuated by fingers 28 disposed to engage and, hence, sense the presence or absence of projections on an embossed card 11 inserted in slot 21. The selector switches and card switches are electrically interconnected in a gating circuit. As is explained in detail below, this circuit is completed for a given program of the selector switches only when a card having a predetermined projection pattern is brought into engagement with the fingers of code switches 25. It is to be understood that the selector switches can be arranged so that only one projection pattern will cause a completed circuit through the switching gate, or alternatively, the selector switches can be arranged so that either of two selected projection patterns will complete the gating circuit.

The code switches 25 and selector switches 24 are carried by front panel 18. This panel is hingedly mounted by means of a hinge 30 to the bottom wall 31 of housing 12. The front panel comprises a vertical face 32 having the horizontal card receiving slot 21 formed therein. The upper portion of the front panel includes an outwardly extending overhanging section 33 and an upper vertical flange portion 34. The flange portion abuts against a gasket member 35 adhesively secured to an angle member 36 which extends transversely beneath the top wall 20 of the housing. Similarly, the two vertical side edges of section 32 engage gaskets 37 adhesively secured to angle members 38 mounted on the inside surface of side walls 16 and 17 of the housing. The front panel is releasably held in the closed position by means of a pivotally mounted hook member 40 mounted for rotation with the barrel member of lock 41.

When the lock 41 is locked by a key inserted in a suitable opening 42, hook member 40 passes behind and engages depending arm 43 of angle plate 44. Engagement of these members holds the front panel in the positions shown in FIGURES 1 and 2. However, when the lock is turned to disengage hook 40 from arm 43, the front panel is free to pivot downwardly into a generally horizontal plane to render the selector switches readily accessible as is shown in FIGURE 11. As is further shown in that figure, lamp bulbs 45 are mounted on opposite sides of lock 41 by means of a bracket 46. These bulbs project light downwardly through openings 47 so that slot 21 is visible at night.

As is shown in FIGURES 2, 6, 10 and 11, a U-shaped bracket member 50 is welded or otherwise secured to the inner surface of the front panel 18. This bracket member includes two rearwardly extending arms 51 having inwardly turned flanges 52 supporting a base member 53 of frame assembly 26. Base member 53 comprises a transverse wall 54 which extends at right angles to the front face of front panel 18 and is disposed in alignment with the lower edge of slot 21, it being understood that this slot extends not only through the front panel 18, but also through portion 55 of bracket 50 which is in engagement with the front wall. Transverse wall 54 of base member 53 thus forms in essence, a shelf for guiding and supporting a card 11 when the card is inserted within the housing. Base member 53 also includes a front depending flange 56 in abutment with portion 55 of bracket 50. Flange 56 is provided with an opening for receiving a pin 57 carried by bracket 50. Base member 53 additionally includes two depending side flanges 58.

Each of these side flanges carries an upright cam plate 60 which is secured to the depending slide flange in any suitable manner, such as by means of bolts 61. Transverse wall 54 of the base member 53 carries two parallel brass slide strips 62. These strips are held in place by means of bolts 63 and 64. The strips 62 engage the bottom wall 65 of slide frame 26.

As is best shown in FIGURES 2 and 7, frame 26 is of generally U-shaped configuration and includes in addition to wall 65 a forward flange 66 and a rearward flange 67. Flange 66 is adapted to abut the portion 53 of bracket 50 to limit forward movement of the slide as is shown in FIGURE 6. Rear flange 67 supports selector switch mounting plate 68, the mounting plate being held in position in any suitable manner, such as by means of bolts 70. Slide frame 26 is guided for movements toward and away from front panel 18 by means of bolts 63 and 64 which pass downwardly through elongated slots 71 in bottom wall 65 of the slide frame. Bolts 63 and 64 carry annular brass sleeves 72 in abutment with the upper surface of bottom wall 65.

Bottom wall 65 also carries a right-angled abutment plate 73. This abutment plate includes a transverse portion 74 which engages wall 65 and is secured thereto as by means of bolts 75. Abutment plate 73 further includes two spaced arms 76, 77 which extend through elongated slots 78—78 in transverse wall 54. These arms are thus disposed for engagement with the leading edge 80 of a card 11 inserted through slot 21. Arms 76 and 77 are joined by a section 81 which carries a switch actuating bolt 82. Switch actuating bolt 82, as is shown in FIGURE 6, engages a pivoted switch finger 83 of card insertion micro switch 84 and is effective to close that switch when the card is fully inserted in the reader as is shown in FIGURE 10.

Slide frame 26 also cooperatively engages a block 85 which supports the code switches 25. Specifically, as is shown in FIGURES 6–10, block 85 carries six card switches C1, C2, C3, C4, C5 and C6 which together comprise the code switch set 25. These card switches are rigidly mounted upon block 85 in any suitable manner. In the specific embodiment shown, the mounting arrangement for these switches includes two end plates 90 and 91 which are bolted to block 85. These end plates carry an elongated pin 92 which passes through aligned openings in the housings of code switches C1–C6. Each of these switches also includes a mounting flange 93 which is bolted to plate 85, the switches being spaced from that plate by means of insulator sleeves 94. Each of the code switches C1–C6 includes a plunger 95 in contact with one of the sensing fingers 28. The sensing fingers are generally cylindrical and are mounted for reciprocation in suitable aligned and spaced bores drilled in block 85. The card engaging tip 96 of each of the fingers is rounded, while the opposite end of each finger is provided with an enlarged head 97 to retain the finger in engagement with block 85.

As is explained in detail below, each of the switches C1–C6 is a single pole, double throw micro switch which completes a circuit to a first contact when the associated finger 28 is extended corresponding to no projection beneath the finger. The code switch in turn completes a circuit to a second contact when the finger 28 is retracted due to the presence of a projection. Block 85 is mounted upon two transverse rods 98 and 100. These rods are press fit or otherwise rigidly secured to the block and extend outwardly from the sides thereof into engagement with the downwardly and rearwardly extending slots 101 and 102 formed in cam plates 60. Rod 98 also passes through vertical slots 103 in side flanges 104 formed on slide frame 65.

It is to be understood that the block 85 and code switches C1–C6 are normally held in the retracted position shown in FIGURE 6 adjacent to the front panel 18 with the fingers 28 spaced from transverse wall 54 substantially more than the maximum thickness of a card. This is accomplished by means of a tension spring 105 stretched between a pin 106 carried by stationary base member 53 and a pin 107 carried by slide frame 26. Spring 105 is effective to urge the slide frame toward front panel 18 until flange 66 abuts wall portion 55. When the slide frame is shifted toward this retracted position, the cooperative engagement of rod 100 with vertical slot 103 forces block 85 toward the front panel. As the block is shifted in this direction, the engagement of rods 98 and 100 with angulated cam slots 101 and 102 is effective to shift the block away from base member 55 and out of the plane of the card slot 21.

Conversely, when a card is inserted within slot 21 and shifted along wall 54, the card ultimately engages arms 76 and 77 of transverse plate 73. As the card is inserted further, its leading edge forces plate 73 and the entire slide frame assembly 26 rearwardly away from front panel 18. As the slide frame assembly moves in this direction, the engagement of shaft 100 with vertical slot 103 forces block 85 rearwardly. At the same time, the engagement of rods 98 and 100 with cam slots 101 and 102 cause the block 85 and switches C1–C6 to be shifted downwardly toward wall 54 and card 11. The rearward motion of the slide frame assembly is limited in any suitable manner, such as by the engagement of the ends of slots 71 with bolts 63 and 64. When the slide frame is disposed in its rearward position, block 85 is shifted downwardly into engagement with the upper surface of the projections 22 on card 11.

It is to be understood that fingers 28 are disposed in a line parallel to the path of movement of the card. These projections are spaced relative to arms 76 which position the leading edge of the card so that the fingers 28 are disposed over predetermined projection sites of one track of the card. When one or more of these projection sites have no projection, the fingers 28 in registry with the sites are extended so that the associated code switches remain in their normal position. However, when a projection is disposed beneath finger 28, the finger is retracted to shift the associated code switch to its actuated position. When the card is fully inserted in the slot, abutment bolt 82 engages switch finger 83 to close card switch 84.

Slide frame 26 also carries the set of selector switches 24. These switches, respectively identified as switches S1, S2, S3, S4, S5 and S6, are mounted upon plate 68. Each of the selector switches S1–S6 is a three-position switch and includes an actuating handle 27 projecting through plate 68. The three handle positions are designated by the letters "A," "B" and "C" imprinted on panel 68. In essence, when one of the handles 27 is disposed in the "A" position, the switch completes a circuit to a first contact; when the handle 27 is in the second or "B" position, the switch completes a circuit to a second contact; and when the switch handle is in the intermediate or "C" position, the switch completes a circuit to both contacts. When the front panel 68 is pivoted downwardly as is shown in FIGURE 11, the handles 27 are readily accessible and can be manipulated to set up any desired program on the selector switches.

FIGURE 5 is an electrical circuit diagram showing the manner in which the card switch 84, the code switches C1–C6 and the selector switches S1–S6 cooperate. As there shown, lines 110 and 111 form a single circuit which is adapted to be completed in the reader through the combination of the code switches, selector switches and card switch. It is to be understood that lines 110 and 111 are connected in series with a power source and relay, or the like (not shown), so that when a circuit is completed through the reader, the relay is energized to operate an electric gate or other electrically actuated device.

Specifically, as is shown in FIGURE 5, line 110 is connected to one contact of card switch 84. The other contact of this card switch is joined to the movable contact 113 of code switch C1. Movable contact 113 of this code switch is normally in engagement with stationary contact 114. However, when code switch C1 is actuated in response to the sensing of a projection by its associated finger 28, movable contact 113 is shifted into engagement with stationary contact 115.

Contacts 114 and 115 of code switch C1 are respectively connected to contacts 116 and 117 of selector switch S1. As indicated above selector switch S1 is a three-position switch. The switch is actually shown in the "B" position, i.e. with its associated switch handle 27 at the "B" end of the slot 118 in plate 68. With the switch in this position, contact 116 is connected to line 120 through contact 121. It is to be understood that if the switch S1 were in the "A" position, contact 117 would be connected to line 120. Similarly, if the switch handle 27 of switch S1 were in the "C" position, both contacts 116 and 117 would be connected to line 120.

Line 120 is in turn connected to the movable contact 122 of code switch C2. This movable contact arm is normally in engagement with contact 123 but is shifted into engagement with contact 124 when a projection is sensed by the associated finger. Contacts 123 and 124 of code switch C2 are respectively interconnected to contacts 125 and 126 of selector switch S2. Selector switch S2 is shown in the "B" condition.

Contacts 125 and 126 are respectively adapted for connection to line 127 when the switch handle of switch S2 is placed in its "B" or "A" condition as explained above. Also, when the switch handle is placed in its "C" position, both contacts 125 and 126 are connected to line 127. It is to be understood that each of the remaining selector switches S3–S6 is adapted for identical operation.

Line 127 is in turn joined to movable contact 128 of code switch C3. This contact arm is normally in engagement with stationary contact 129 but is shifted into engagement with contact 130 when a projection is sensed. Contacts 129 and 130 of code switch C3 are respectively connected to stationary contacts 131 and 132 of selector switch S3 which is shown in the "A" condition. Contacts 131 and 132 are adapted for interconnection to line 133 in accordance with the position of the switch handle of selector switch S3 in the manner explained above.

Line 133 is connected to movable contact arm 134 of code switch C4. This contact arm is normally in engagement with contact 135 and is shifted into engagement with contact 136 when a projection is sensed on the card by the finger associated with switch C4. Contacts 135 and 136 are respectively joined to contacts 137 and 138 of selector switch S4 which is shown in the "A" condition. Either or both of these contacts can be connected to a lead 140 by shifting the switch handle of switch S4 in the manner explained above.

Lead 140 is joined to movable contact arm 141 of code switch C5. This switch arm normally engages contact 142 when no projection is sensed, but is shifted into engagement with contact 143 in response to the presence of a projection beneath the associated finger 28. Contacts 142 and 143 of code switch C5 are respectively connected to contacts 144 and 145 of selector switch S5 which is shown in the "B" position in solid lines. The dotted lines indicate the connections made to line 146 when the switch is in the "C" position.

Line 146 is joined to movable switch arm 147 of code switch C6. This switch arm is normally in engagement with contact 148 when no projection is sensed, but is shifted into engagement with contact 150 when the associated finger 28 engages a projection on the card. Contacts 148 and 150 are respectively joined to contacts 151 and 152 of selector switch S6 which is shown in the "A" condition. Either one or both of the contacts 151 and 152 are joined to line 111 depending upon the position of the switch S6 as explained above.

The relationship of the coding on the cards to the code switches and the program of the selector switches can best be understood from a consideration of FIGURES 3 and 12. The card shown in FIGURE 3 is coded for use with the reader when the reader is programmed in the manner shown in FIGURES 5 and 11. This same card, with only the single track sensed by the reader, is shown in FIGURE 12 as card 11a. Next to the card is indicated the position of the selector switches S1–S6 which render this card effective to complete a circuit through the reader.

In order to facilitate a fuller understanding of the advantages of the present reader, two cards adapted for subsequent use are shown in FIGURE 12 and are identified as cards 11b and 11c. It is to be understood that card 11a might be used during the month of January for example, card 11b might be used during the month of February and card 11c might be used during the month of March. It is also to be understood that while only the projections along a single track are shown on each of the cards 11b and 11c, these cards would, in practice, have projections placed along other tracks in the manner of the card shown in FIGURE 3.

As is used in this application, the term "track" is used to designate a line parallel to the elongated edge of the card on which projections may be formed. In the present coding arrangement, projections can be formed along any of five tracks or lines, designated T1, T2, T3, T4 and T5. The reader shown in the drawings actually senses the projections only on track 1. Hence, the projections on the other tracks have no functional significance other than to conceal which projections are being sensed. On the other hand, the reader can be constructed to sense projections on any other track, such as tracks T2, T3, T4, or T5, merely by substituting for block 85 and code switch set 25 a new block and code switch set having fingers 28 shifted transversely relative to slot 21 and, hence, of a card 11 inserted in the slot. In other words, the track sensed is determined by the lateral position of the row of fingers 28 relative to the card when a card is inserted in the slot.

Each track of the card includes twelve equispaced projection sites. These projection sites are numbered 1–12 going from left to right in FIGURES 3 and 12. In the present reader, the fingers 38 engage, or sense, projections in the odd numbered projection sites, i.e. in sites 1, 3, 5, 7, 9 and 11. The even numbers in the code placed above projection sites 2, 4, 6, 8, 10 and 12 are utilized to convey coded information to the installers and operators of the equipment, such as the code number of the card, the month during which it is to be used, the track read by the device and the margin from the edge of the card to the first projection. This use of these code numbers is of no significance to the present invention.

To program the reader for use with cards coded in the manner shown in FIGURE 3 and by the card 11a, the selector switch handles are shifted to the position shown in FIGURE 11. This program is shown opposite card 11a in FIGURE 12. It is to be understood that the operator is provided with a program schedule corresponding in general to the information contained in the table to the right of FIGURE 12. The electrical connections provided by the selector switches is illustrated in FIGURE 5. When the card 11a is inserted in the reader, the contact fingers 28 associated with code switches C1 and C2 sense a lack of projections on projection sites 1 and 3. Hence, the switch arms 113 and 122 remain in the position shown in FIGURE 5. The fingers 28 associated with code switches C3 and C4 sense the projections in projection sites 5 and 7 respectively. Accordingly, the contact arms 128 and 134 are respectively shifted into engagement with contacts 130 and 136. The finger 28 associated with code switch C5 senses no projection in the ninth projection site so that switch C5 remains in the position shown in FIGURE 5. However, the contact finger associated with switch C6 engages a projection in projection site 11 so that arm 147 is shifted into engagement with contact 150. When the card is fully inserted, card switch 84 is closed and a circuit is thus completed through the reader from line 110 to line 111.

On the first of February, the parking lot patrons are given new cards 11b. However, not all patrons, as a practical matter, are able to obtain their cards on a given day so that it is desirable to have a short period, for example five days, when either the January or the February cards can be inserted in the reader to close the circuit and actuate the entrance gate or the like. In accordance with the present invention, the next subsequent card used, i.e. card 11b, differs from card 11a in only one of the six projection sites sensed. Of course, any number of changes can be made in the projection sites not sensed by code switches C1–C6.

In the specific card illustrated, the significant change is made in the ninth projection site, i.e. card 11b contains a projection in this site whereas card 11a did not. To set up the selector switches so that either card 11a or 11b will work, selector switch S5 associated with code switch C5 which senses the month site, is shifted to the "C" position as indicated in FIGURE 12 and as shown in dotted lines in FIGURE 5. With this selector switch in the "C" position, both contacts 144 and 145 of the selector switch are connected to line 146. As a result, whether code switch C5 fails to sense a projection, as when card 11a is inserted, or whether switch C5 senses a projection, as when card 11b is inserted, a circuit is still completed through the reader. At the end of five days when it is desired to have only the February cards effective to actuate the reader, the handle of selector switch S5 is shifted to the "A" position. Now only contact 145 is joined to line 146 and in order to complete a circuit to the unit, code swtich C5 must be actuated by a projection so that contact arm 141 engages contact 143.

In a similar manner, the March card 11c differs from card 11b only in the eleventh projection site. Card 11b has a projection in this projection site while card 11c has none. Again, during the first five days of March, selector switch S6 associated with code switch C6 which senses the eleventh site is shifted to the "C" position so that both the February card 11b and the March card 11c will close the reader. Subsequently, for example on March 5, the selector switch S6 is shifted to the "B" position. With the switch in that position, only the March card will complete a circuit through the reader.

From the above disclosure of the general principles of the present invention and the above description of a preferred embodiment, those skilled in the art will readily comprehend the various modifictions to which the present invention is susceptible. Accordingly, I desire to be limited only by the scope of the following claims.

Having described my invention, I claim:

1. A card reader for reading embossed, semi-rigid cards, said card reader comprising a member having a card receiving slot, a shelf element for supporting a card inserted through said slot, a slide assembly, a plurality of code switches, a plurality of code switch actuating elements carried by said slide assembly for engagement with preselected areas of a card, said slide assembly including abutment means disposed for engagement with the end of said card when said card is inserted in said slot, means mounting said slide assembly for reciprocating movement parallel to said shelf in response to movement of said card against said abutment means, and cam means associated with said slide for forcing said switches toward said shelf upon linear movement of said slide.

2. A card render for reading embossed, semi-rigid cards, said card reader comprising a housing including a front panel member having a card receiving slot, a shelf element for supporting a card inserted through said slot, a slide assembly, a plurality of code switches, a plurality of code switch actuating elements carried by said slide assembly for engagement with preselected areas of a card, said slide assembly including abutment means disposed for engagement with the end of said card when said card is inserted in said slot, means mounting said slide assembly for reciprocating movement parallel to said shelf in response to movement of said card against said abutment means, and cam means associated with said slide for forcing said switches toward said shelf upon linear movement of said slide, and a plurality of selector switches disposed within said housing. said selector switches being connected in an electrical gating circuit with said code switches.

3. A card reader for reading embossed, semi-rigid cards, said card reader comprising a housing including a front panel member having a card receiving slot, a shelf element carried by said front panel for supporting a card inserted through said slot, a slide assembly carried by said front panel, a plurality of code switches, a plurality of code switch actuating elements carried by said slide assembly for engagement with preselected areas of a card, said slide assembly including abutment means disposed for engagement with the end of said card when said card is inserted in said slot, means mounting said slide assembly for reciprocating movement parallel to said shelf in response to movement of said card against said abutment means, and cam means associated with said slide for forcing said switches toward said shelf upon linear movement of said slide, and a plurality of selector switches disposed within said housing, said selector switches being connected in an electrical gating circuit with said code switches, said front panel being pivotally mounted to provide access to said selector switches.

4. A card reader for reading embossed, semi-rigid cards, said card reader comprising a housing including a front panel member having a card reciving slot, a shelf element carried by said front panel for supporting a card inserted through said slot, a slide assembly carried by said front panel, a plurality of code switches, a plurality of code switch actuating elements carried by said slide assembly for engagement with preselected areas of a card, said slide assembly including abutment means disposed for engagement with the end of said card when said card is inserted in said slot, means mounting said slide assembly for reciprocating movement parallel to said shelf in response to movement of said card against said abutment means, and cam means associated with said slide for forcing said switches toward said shelf upon linear movement of said slide, and a plurality of selector switches disposed within said housing and carried by said slide assembly, said selector switches being connected in an electrical gating circuit with said code switches, said front panel being pivotally mounted to provide access to said selector switches.

5. A card reader for reading embossed, semi-rigid cards, said card reader comprising a member having a card receiving slot, a shelf element for supporting a card inserted through said slot, a slide assembly, means mounting said slide assembly for reciprocation along said shelf, a block, a plurality of code switches carried by said block, a plurality of switch actuating elements carried by said block and extending through bores in said block for engagement with preselected areas of a card, said slide assembly including abutment means disposed for engagement with the end of said card when said card is inserted in said slot, means interconnecting said slide assembly with said block whereby said block is reciprocated with said slide assembly, and cam means interconnected to said block for forcing said block and switch actuators toward said shelf upon reciprocating movement of said slide.

6. A card reader for reading embossed, semi-rigid cards, said card reader comprising a shelf element for engagement with a card inserted in said reader, a plurality of switches, a plurality of switch actuating elements for engagement with preselected areas of said card, abutment means disposed for engagement with the end of said card when said card is inserted in said reader, means mounting said switch actuating elements for reciprocating movement in response to movement of said card against said abutment means, and cam means for forcing said switch actuators toward a card in response to linear movement of said abutment means.

7. A card reader for reading embossed, semi-rigid cards, said card reader comprising a shelf element for engagement with a card inserted in said reader, a plurality of double throw switches, a plurality of switch actuating elements for engagement with preselected areas of said card, abutment means disposed for engagement with the end of said card when said card is inserted in said reader, means mounting said switch actuating elements for reciprocating movement in response to movement of said card against said abutment means, and cam means for forcing said switch actuators toward a card in response to linear movement of said abutment means.

8. A card reader for reading an embossed card and actuating an electrical device in response to the presence of a preselected embossed code pattern on said card, said reader comprising a plurality of code switches, each of said switches having an actuator adapted to sense the presence or absence of a projection on a predetermined area of said card, each of said code switches being effective to complete a circuit to one contact when no projection is sensed and being effective to complete a circuit to a second contact when a projection is sensed, and a plurality of manually operated selector switches, said selector switches and said code switches being connected in a gating circuit, at least one of said selector switches being a three-position switch and being interconnected with an associated code switch, whereby when the selector switch is in a first position the gating circuit is completed in response to the sensing of a projection by the associated code switch, and when the selector switch is in a second position the gating circuit is closed in response to the sensing of a lack of projection by the associated code switch, and when the selector switch is in the third position the gating circuit is closed in response to the sensing of a projection or a lack of projection by the associated code switch.

9. A card reader for reading an embossed card and actuating an electrical device in response to the presence of a preselected embossed code pattern on said card, said reader comprising a plurality of code switches, each of said switches having an actuator adapted to sense the presence or absence of a projection on a predetermined area of said card, each of said code switches being effective to complete a circuit to one contact when no projection is sensed and being effective to complete a circuit to a second contact when a projection is sensed and a plurality of manually operated selector switches corresponding in number to said code switches, said selector switches and said code switches being connected in a gating circuit, at least one of said selector switches being a three-position switch and being interconnected with an associated switch, whereby when the selector switch is in a first position the gating circuit is completed in response to the sensing of a projection by the associated code switch, and when the selector switch is in a second position the gating circuit is closed in response to the sensing of a lack of projection by the associated code switch, and when the selector switch is in the third position the gating circuit is closed in response to the sensing of a projection or a lack of projection by the associated code switch.

10. A card reader for reading an embossed card and actuating an electrical device in response to the presence of a preselected embossed code pattern on said card, said reader comprising a plurality of code switches, each of said switches having an actuator adapted to sense the presence or absence of a projection on a predetermined area of said card, each of said code switches being effective to complete a circuit to one contact when no projection is sensed and being effective to complete a circuit to a second contact when a projection is sensed, and a plurality of manually operated selector switches corresponding in number to said code switches, said selector switches and said code switches being connected in a gating circuit, each of said selector switches being a three-position switch and being interconnected with an associated code switch, whereby when the selector switch is in a first position the gating circuit is completed in response to the sensing of a projection by the associated code switch, and when the selector switch is in a second position the gating circuit is closed in response to the sensing of a lack of projection by the associated code switch and when the selector switch is in a second position the gating circuit is closed in response to the sensing of a lack of projection by the associated code switch, and when the selector switch is in the third position the gating circuit is closed in response to the sensing of a projection or a lack of projection by the associated code switch.

11. A card reader for reading an embossed card and actuating an electrical device in response to the presence of a preselected embossed code pattern on said card, said reader comprising a plurality of code switches, each of said switches having an actuator adapted to sense the presence or absence of a projection on a predetermined area of said card, each of said code switches having two contacts and an arm effective to complete a circuit to a first contact when no projection is sensed and being effective to complete a circuit to a second contact when a projection is sensed, and a plurality of selector switches corresponding in number to said code switches, each of said selector switches having first and second contacts interconnected to the two contacts of a code switch, at least one of said selector switches being a three-position switch, manual means controlling said selector switch, said selector switch in a first position completing a circuit through said first selector switch contact, said selector switch in a second position closing a circuit to said second selector switch contact, and said selector switch in the third position closing a circuit to both said first and second selector switch contacts.

12. A card reader for reading an embossed card and actuating an electrical device in response to the presence of a preselected embossed code pattern on said card, said reader comprising a plurality of code switches, each of said switches having an actuator adapted to sense the presence or absence of a projection on a predetermined area of said card, each of said code switches having two contacts and an arm effective to complete a circuit to a first contact when no projection is sensed and being effective to complete a circuit to a second contact when a projection is sensed, and a plurality of selector switches corresponding in number to said code switches, each of said selector switches having first and second contacts interconnected to the two contacts of a code switch, each of said selector switches being a three-position switch, manual means controlling said selector switch, said selector switch in a first position completing a circuit through said first selector switch contact, said selector switch in a second position closing a circuit to said second selector switch contact, and said selector switch in the third position closing a circuit to both said first and second selector switch contacts.

13. A card reader for reading an embossed card and actuating an electrical device in response to the presence of a preselected embossed code pattern on said card, said reader comprising a plurality of code switches, each of said switches having an actuator adapted to sense the presence or absence of a projection on a predetermined area of said card, each of said code switches having two contacts and an arm effective to complete a circuit to a first contact when no projection is sensed and being effective to complete a circuit to a second contact when a projection is sensed, and a plurality of selector switches corresponding in number to said code switches, each of said selector switches having first and second contacts interconnected to the two contacts of a code switch, each of said selector switches being a three-position switch, manual means controlling said selector switch, said selector switch in a first position completing a circuit through said first selector switch contact, said selector switch in a second position closing a circuit to said second selector switch contact, and said selector switch in the third position closing a circuit to both said first and second selector switch contacts, and a card position responsive switch in series with said code switches and said selector switches.

14. A card reader for reading embossed cards and actuating an electrical device in response to the presence of a preselected embossed code pattern on said cards, said reader comprising a plurality of code switches, each of said switches having an actuator adapted to sense the presence or absence of a projection on a predetermined area of said card, each of said code switches being a double throw switch, and a plurality of selector switches equal in number of said code switches, said selector switches and said code switches being connected in a gating circuit, at least one of said selector switches being a three-position switch and being interconnected with an associated code switch, whereby when the selector switch is in a first position the gating circuit is completed in response to the sensing of a projection by the associated code switch, and when the selector switch is in a second position the gating circuit is closed in response to the lack of projection by the associated code switch, and when the selector switch is in the third position the gating circuit is closed in response to the sensing of a projection or a lack of projection by the associated code switch.

15. A card reader for reading embossed cards and actuating an electrical device in response to the presence of a preselected embossed code pattern on said cards, said reader comprising a plurality of code switches, each of said switches having an actuator adapted to sense the presence or absence of a projection on a predetermined area of said card, each of said code switches being a double throw switch, and a plurality of selector switches equal in number to said code switches, said selector switches and said code switches being connected in a gating circuit, each of said selector switches being a three-position switch and being interconnected with an associated code switch, whereby when the selector switch is in a first position the gating circuit is completed in response to the sensing of a projection by the associated code switch, and when the selector switch is in a second position the gating circuit is closed in response to the lack of projection by the associated code switch, and when the selector switch is in the third position the gating circuit is closed in response to the sensing of a projectiong or a lack of projection by the associated code switch.

References Cited by the Examiner
UNITED STATES PATENTS

| | | | |
|---|---|---|---|
| 3,116,380 | 12/1963 | Miller | 200—46 |
| 3,184,714 | 5/1965 | Brown et al. | 340—149 |

ORIS L. RADER, *Primary Examiner.*

T. B. JOIKE, *Assistant Examiner.*